United States Patent
Allen, Jr. et al.

(10) Patent No.: US 7,336,667 B2
(45) Date of Patent: Feb. 26, 2008

(54) APPARATUS, METHOD AND PROGRAM PRODUCT TO GENERATE AND USE CRC IN COMMUNICATIONS NETWORK

(75) Inventors: James J. Allen, Jr., Raleigh, NC (US); Jean L. Calvignac, Cary, NC (US); Natarajan Vaidhyanathan, Greensboro, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 10/301,247

(22) Filed: Nov. 21, 2002

(65) Prior Publication Data
US 2004/0100966 A1 May 27, 2004

(51) Int. Cl.
*H04L 12/28* (2006.01)
*H03M 13/00* (2006.01)

(52) U.S. Cl. .................... 370/395.64; 370/395.62; 370/395.63; 370/395.64; 370/395.65; 714/746; 714/758; 714/776; 714/781

(58) Field of Classification Search .......... 370/395.52–395.65; 714/746, 758, 776, 781
See application file for complete search history.

(56) References Cited

U.S. PATENT DOCUMENTS

| | | | |
|---|---|---|---|
| 5,117,417 A | 5/1992 | Danner | 370/13 |
| 5,402,417 A | 3/1995 | Aramaki | 370/60 |
| 5,541,926 A | 7/1996 | Saito et al. | 370/94.2 |
| 5,579,317 A | 11/1996 | Pang et al. | 370/94.1 |
| 5,664,116 A | 9/1997 | Gaytan et al. | 395/200.64 |
| 5,818,539 A | 10/1998 | Naimpally et al. | 348/512 |
| 5,878,063 A | 3/1999 | Kawasaki et al. | 371/65 |
| 5,987,030 A | 11/1999 | Brockhage et al. | 370/394 |
| 5,987,034 A | 11/1999 | Simon et al. | 370/465 |
| 6,023,467 A | 2/2000 | Abdelhamid et al. | 370/395 |
| 6,041,054 A | 3/2000 | Westberg | 370/389 |
| 6,061,820 A * | 5/2000 | Nakakita et al. | 714/751 |

(Continued)

FOREIGN PATENT DOCUMENTS

WO  99/16284  4/1999

OTHER PUBLICATIONS

Rich Stankevich, "Voice-Over-Atm Builds on New Standard The ATM Adaptation Layer 2 (AAL2), (Mar. 1999-CTI) Breakthrough", www.gdc.com/products/prod_atm_vsm.shtml. 1997-2007.

*Primary Examiner*—Edan Orgad
*Assistant Examiner*—Venkatesh Haliyur
(74) *Attorney, Agent, or Firm*—Joscelyn G. Cockburn; Anthony M. Del Zoppo, III; Driggs, Hogg & Fry Co, LPA

(57) ABSTRACT

The CRC for the CPS Header of an ATM AAL2 cell is generated by a CRC generator which uses the 8 bits of the CID field to generate partial 5 bits CRCs which are loaded in a first table. The 6 bits LI field and 5 bits UUI field are added to the partial 5 bits CRC to form 16 bits. The CRC generator uses the $2^{16}$ bits to generate a second CRC table. The CRC for a particular CPS header is generated by correlating bits in the CID field, Li field and UUI field with the two tables.

15 Claims, 4 Drawing Sheets

U.S. PATENT DOCUMENTS

| | | | |
|---|---|---|---|
| 6,075,798 A * | 6/2000 | Lyons et al. | 370/474 |
| 6,160,822 A | 12/2000 | Kobayashi | 370/511 |
| 6,269,464 B1 * | 7/2001 | Boussina et al. | 714/752 |
| 6,289,016 B1 * | 9/2001 | Subbiah et al. | 370/395.1 |
| 6,574,224 B1 * | 6/2003 | Brueckheimer et al. | 370/395.6 |
| 6,618,383 B1 * | 9/2003 | Tomlins | 370/395.5 |
| 6,912,683 B2 * | 6/2005 | Rifaat et al. | 714/774 |
| 6,961,340 B2 * | 11/2005 | Karlsson et al. | 370/395.6 |
| 6,988,236 B2 * | 1/2006 | Ptasinski et al. | 714/758 |
| 6,990,108 B2 * | 1/2006 | Karlsson et al. | 370/395.6 |
| 7,075,936 B2 * | 7/2006 | Hathaway et al. | 370/395.64 |
| 7,269,175 B2 * | 9/2007 | Karlsson et al. | 370/395.6 |
| 2002/0015405 A1 * | 2/2002 | Sepponen et al. | 370/389 |
| 2002/0085564 A1 * | 7/2002 | Lee | 370/395.6 |
| 2002/0131457 A1 * | 9/2002 | Akiyama | 370/519 |
| 2003/0237039 A1 * | 12/2003 | Qiu | 714/758 |

\* cited by examiner

APPARATUS, METHOD AND PROGRAM PRODUCT TO GENERATE AND USE CRC IN COMMUNICATIONS NETWORK

BACKGROUND OF THE INVENTION

1. Field of the Invention

The present invention relates to CRC (Cyclic Redundancy Check) generation in general and in particular to CRC generation as applies to ATM technology.

2. Prior Art

The description which follows presupposes knowledge of data communications networks, protocols, and devices (such as routers, switches, etc.) used to transport data within said communications networks.

One of the well known protocols used to shuttle data in communications networks is Asynchronous Transfer Mode (ATM). In ATM the data is packaged in ATM cells by source network devices and transported on ATM links to network destination devices.

In the recommendation 1.363, ITU (International Telecommunications Union) has defined 4 ATM adaptation layers (AAL). The goal of AAL is to provide useful services to application programs and to shield them from the burden of splitting the data up into cells at the source and reassembling at the destination. AAL1 is the protocol for transmitting real-time constant bit rate connection-oriented traffic such as audio and video. However, for compressed audio or video, the rates can vary strongly over time. AAL2 has been defined in 1.363.2 by ITU for handling such type of traffic. This invention concerns itself about AAL2. The ATM cell in AAL2 format can contain multiple full or partial CPS (Common Part Sublayer) packets. The CPS packet header consists of the following fields: channel identifier (CID), a length code (LI), a user to user information (UUI) and a cyclic redundant code (CRC). The lengths of these fields are as follows: CID is 8 bits long, Li is 6 bits long and UUI is 5 bits long and CRC is 5 bits long. Thus the length of the CPS packet header is 24 bits or 3 bytes long. The five bit CRC protects the fields CID, Li and UUI.

A straightforward and brute force way of generating the CRC would be to use standard CRC algorithms to generate the CRC based upon all $2^M$ possible values to be protected where M represents number of bits in the fields that need protection. For the CPS Hdr M=19, therefore, the CRC table would be rather large requiring $2^{19}$ entries. A CRC table with $2^{19}$ entries would require a large amount of storage.

In some machines storage spaces are limited. Therefore, this size storage is not available for storing CRC tables. Even in machines where storage space is available only high speed memories could be used. High speed memories are necessary in order to meet performance requirements of most systems. The high speed memories suitable for this type of usage are very expensive and would increase the overall cost of the system. If one were to use low performance memories which are relatively inexpensive the lookup time to access low performance memories are usually long and would adversely affect system throughput.

In either case the options available are not acceptable. Therefore, there is a need to provide CRC generation in which the CRC table requires minimum amount of storage.

BRIEF DESCRIPTION OF THE INVENTION

The invention contemplates a partial CRC calculation to generate an n bit CRC which requires much less storage than the brute force approach.

In particular, the method includes using the 8 bits of the CID field and a standard CRC algorithm to generate $2^8$-5 bits CRCs which are placed in a first table with $2^8$ entries. The 5 bits CRC is concatenated to the 6 LI bits and 5 UUI bits forming 16 bits. The CRC algorithm generates $2^{16}$-5 bits CRCs which are packaged in a second table with $2^{16}$ entries. When data is transmitted the 5 bits CRC is placed in the CRC field of the CPS Hdr. When data is received the CRC is calculated from bits in the CID, LI and UUI fields and compared against the received CRC to determine whether the data is good or bad. If the calculated CRC matches the received CRC the data is deemed good. If the calculated and received CRCs do not match the data is deemed bad and probably discarded.

To determine the CRC for a particular header the CID bits for that particular header is used as an address to access the first table (table 1). The predefined CRC stored at the accessed location is concatenated to bits of the LI and UUI fields to form an address to access the second table (table 2). The CRC at the accessed address is the CRC for the related CPS Header which is transmitted, if a transmission, or compare against received CRC, if a reception. For a reception if the calculated CRC differs from the received CRC the data would be deemed contaminated and would probably be rejected.

DESCRIPTION OF THE ILLUSTRATED EMBODIMENT

The present invention to be described herein can be used to calculate cyclic redundancy check CRC for serial data stream. It works well in computing CRC for Asynchronous Transfer Mode (ATM) AAL2 cell and as such will be described in that environment. However, this should not be construed as a limitation on the scope of the present invention since it is well within the skill of one skilled in the art to make changes which would allow the present invention to function in different environments without departing from the teachings or spirit of the claims as set forth hereinafter. Any such change or adaptation of the invention is intended to be covered by the claims set forth herein.

Figure 1A:
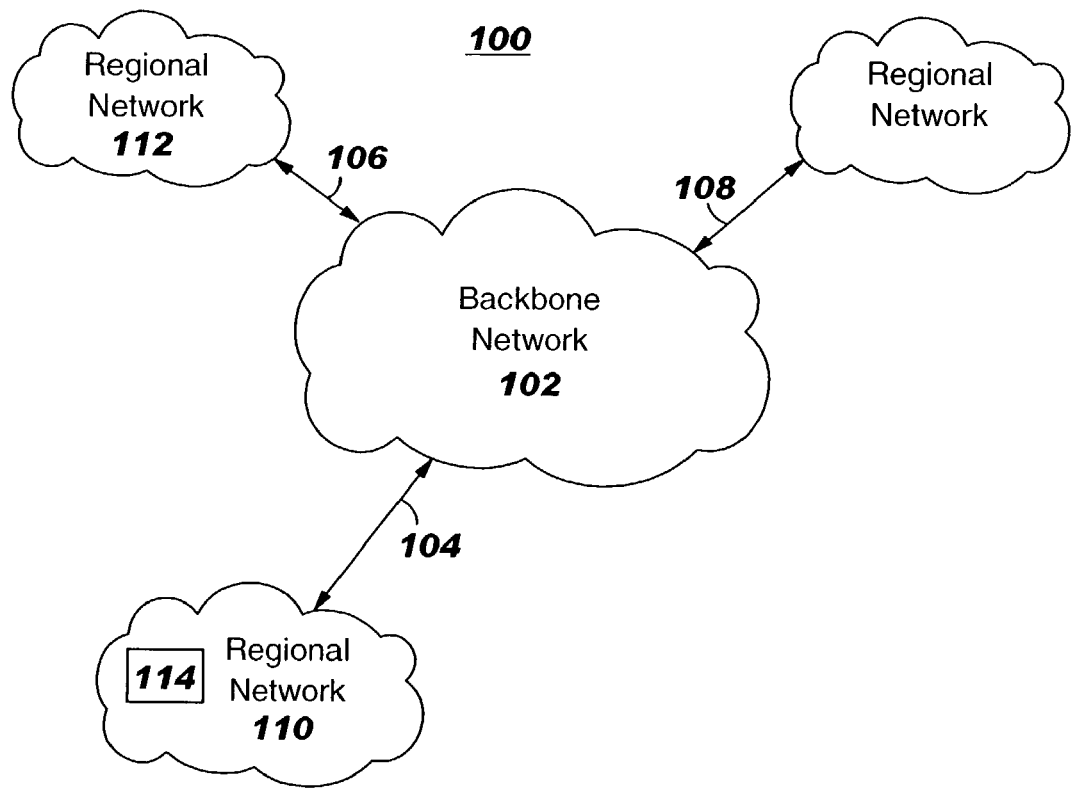
FIGS. 1A and 1B show a communications network in which the present invention can be implemented.

FIG. 1A shows a communications network 100 in which a backbone network 102 is coupled over interconnecting assemblies 104, 106 and 108 to regional networks 110, 112 and 114. The relative size of the network is an indication of its complexity. Thus, the backbone network 102 is a much larger network than the regional network which it supports. The backbone network 102 could be the worldwide web (WWW) better known as the Internet or any company or government network that supports several smaller networks. Each of the regional networks support a specific geographical area such as a city or a company's campus, etc. Each of the networks are provided with necessary facilities to enable a network device in any of the regional networks to communicate with network devices within its geographical area or outside of its geographical area via the backbone network 102 to a network device in a remote regional network. This type of configuration is well known in the prior art therefore, further discussion is not warranted. Suffice it to say an ATM subsystem 114 is fabricated in one of the regional networks 110. The invention according to the teaching of the present invention is implemented in the ATM subsystem 114.

Figure 1B:
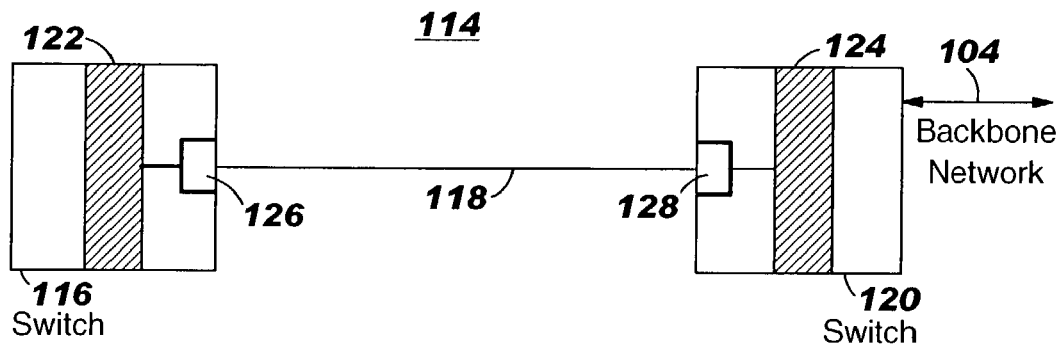

FIG. 1B shows a simplified diagram of the ATM subsystem 114 which includes network device 116 interconnected by a transmission link 118 to network device 120. The network devices can be any of the well known devices which are interconnected in a network. For purposes of describing the present invention network devices 116 and 120 could be switches, servers or a mix of both with each provided with ATM blades 122 and 124, respectively. ATM blade 122 is coupled to ATM port 126. Likewise, ATM blade 124 is coupled to ATM port 128. Even though the ATM devices are identified as switches or servers this should not be construed as a limitation on the scope of the invention since any of the other well known devices which practice the ATM protocol could be used without departing from the spirit or scope of the present invention. Switch 120 is a border or edge switch with interconnecting assembly 104 providing the communication path to and from the backbone network 102. A controller that provides ATM function including the teaching of the present invention is fabricated on each of the ATM blades. The ATM controller can be as sophisticated as a Network Processor such as the NP4GS3 developed and marketed by IBM Corporation or it can be a simple controller as the one shown in FIG. 2.

Figure 2:
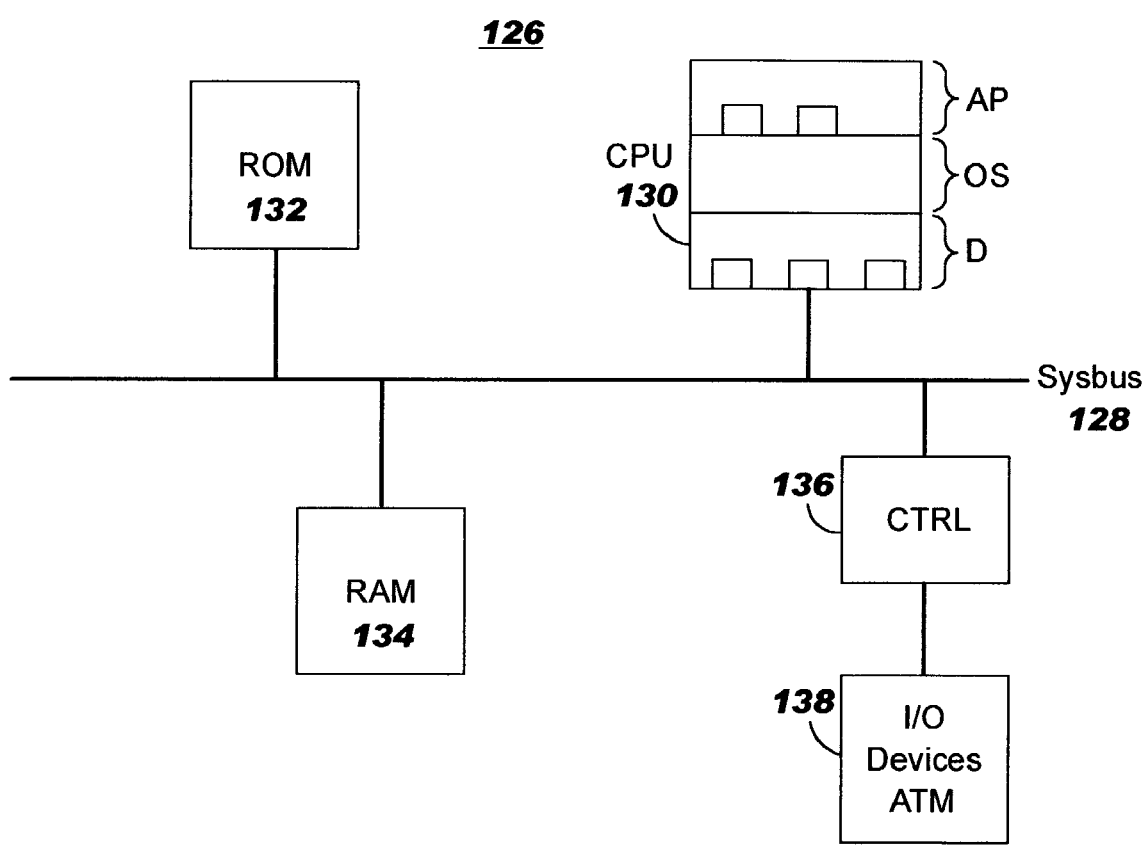
FIG. 2 shows a block diagram of a network device in which the present invention is implemented.

Turning now to FIG. 2 an ATM controller which would be mounted on the ATM blade is shown. ATM controller 126 includes system bus 128 to which a CPU 130, (read only memory) ROM 132 and RAM 134 are operatively connected. A bus controller 136 interconnects a plurality of I/O devices (not shown) and an ATM link to the system bus 128. In the controller shown in FIG. 2 RAM 134 is used as storage for ATM frames received from the network and storage for tables which are generated by the CPU according to the teachings of the present invention. The function of the ROM is to provide storage for instructions used by the CPU 130. The structure of the software in CPU 130 include drivers D, an operating system OS and application programs (APs) running on top of the operating system. The application programs (among other things) provide the mechanism that are used to practice the invention set forth herein.

Figure 3:
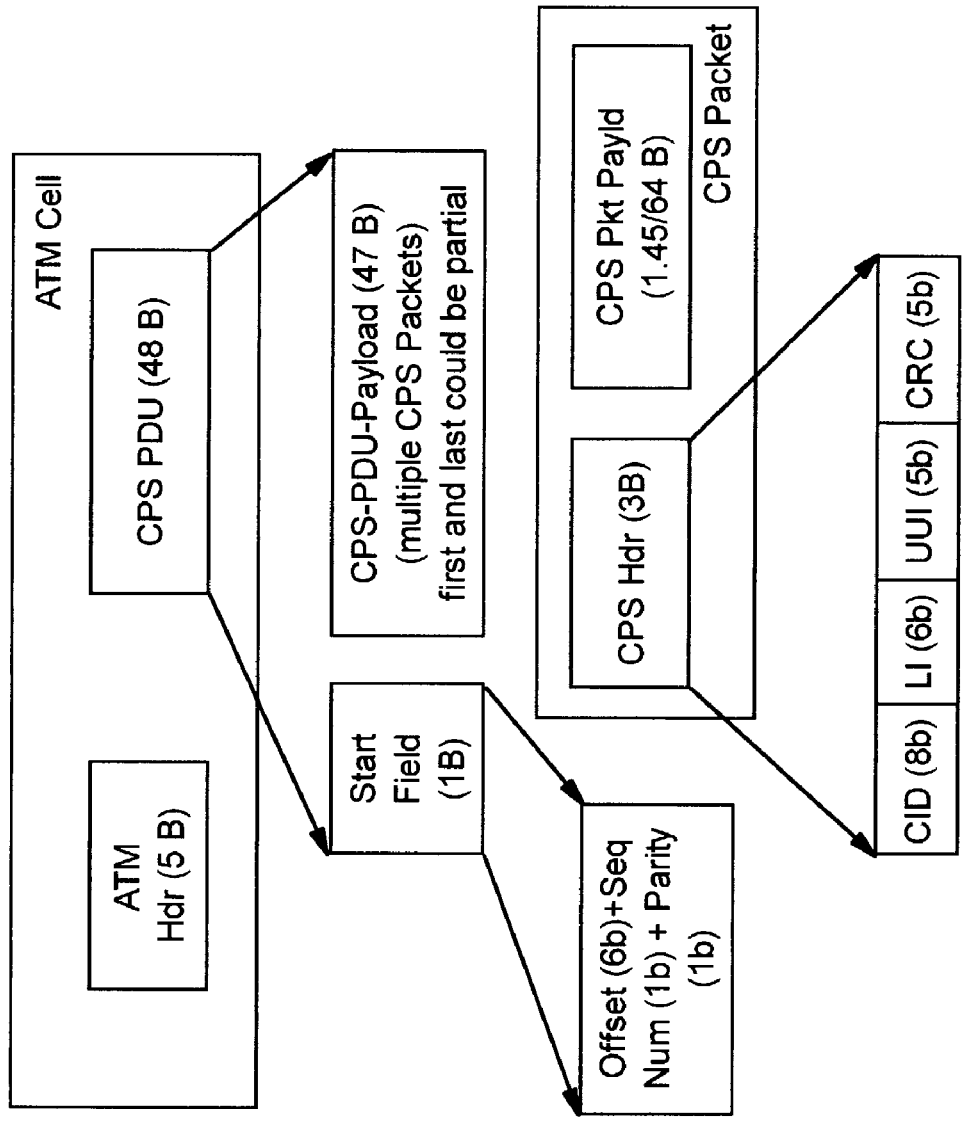
FIG. 3 shows a graphical representation of the ATM AAL2 cell.

Before describing the present invention in more detail a description of the AAL2 cell structure shown in FIG. 3 will be given. As stated previously the AAL2 layer is an adaptation on the ATM cell. As used in this description B represents bytes whereas b represents bits. The ATM cell includes an ATM header of 5 bytes and CPS-PDU of 48 bytes. The CPS-PDU 48 bytes are further broken down into a start field of one byte and a CPS-PDU-payload of 47 bytes. It should be noted that multiple CPS packets can be loaded into the CPS-PDU-payload with first and last packet being partial ones. The one byte start field is further broken down into an offset of 6 bits, a sequence number of 1 bit and 1 parity bit. The CPS-PDU-Payload is further broken down into a CPS header of 3 bytes and CPS packet payload. The portion of the cell that is of interest to the present invention is the CPS header field which is further partitioned into a CID field of 8 bits, LI field of 6 bits, UUI field of 5 bits and a 5-bit CRC field. The 5-bit CRC is calculated based upon the CID, LI and UUI fields and are inserted in the CPS header field when a cell is transmitted from a source station. When a cell is received in the destination station the CRC based upon the CID field, LI field and UUI field is calculated and compared with the 5-bit CRC received in the cell. If the received and calculated CRCs are different the data is corrupted and would be discarded. It should be noted that the structure for the AAL2 cell is described in ITU-T Rec I363.2(09/97) B-ISDN ATM Adaptation Layer Specification: Type 2 AAL which is incorporated herein by reference.

Figure 4:
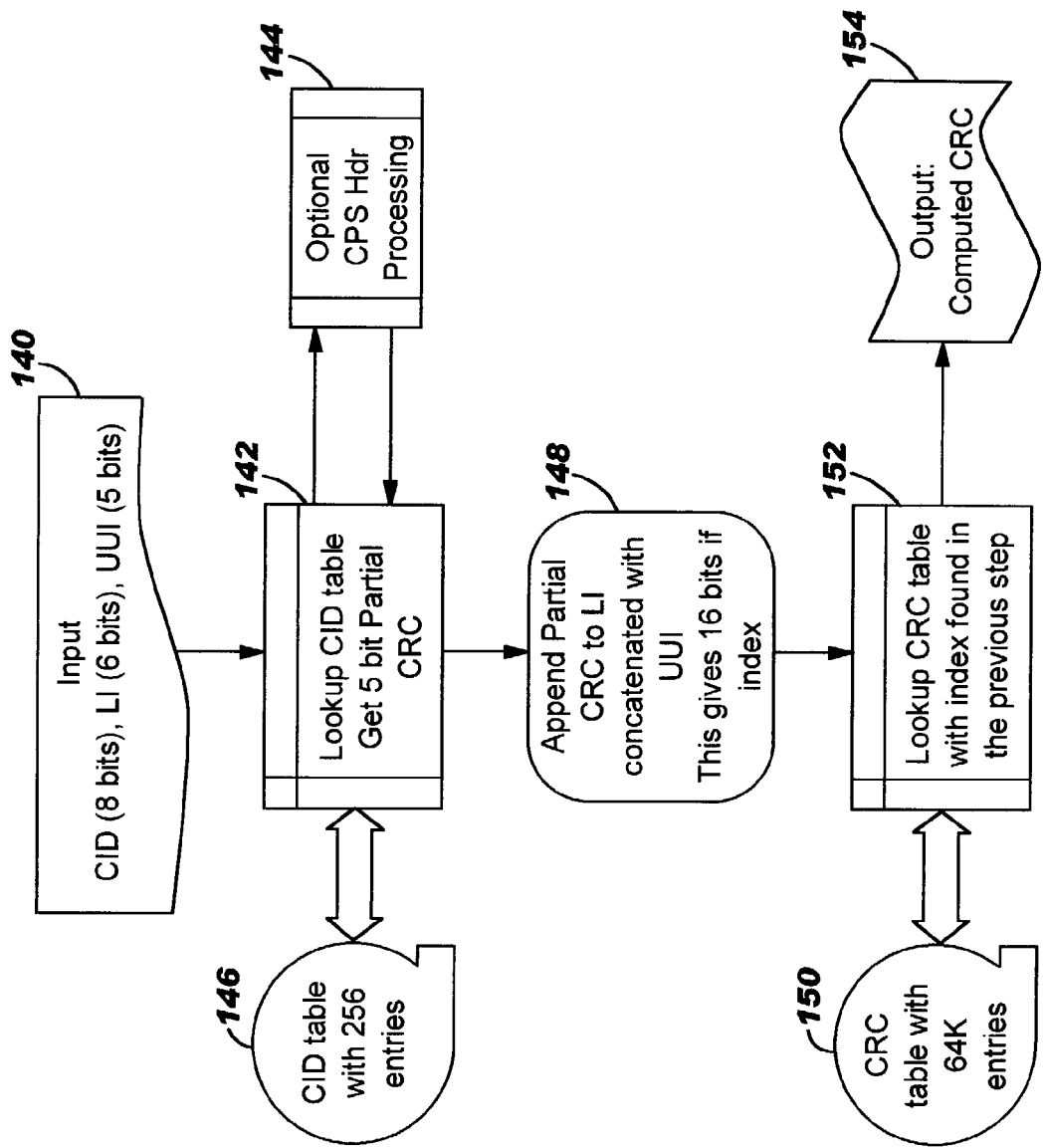
FIG. 4 shows a flowchart of the method according to the teachings of the present invention to generate the CRC.

FIG. 4 shows a flowchart of the method used to generate the CRC according to the teachings of the present invention. The program implementing the flowchart is implemented as an application program executed in CPU 130 (FIG. 2) or in the NP4GS3. The process requires generating CID table 146 which has 256 entries and CRC table 150 with 64,000 entries. Further details of the tables generation will be given subsequently. Suffice it to say the 256 ($2^8$) entries are based upon the 8 bits in the CID field whereas the $2^{16}$ entries are based upon the 5 bits CRC calculated in (table 1)+6 bits in the LI field+5 bits in the UUI field.

Still referring to FIG. 4, once the tables are generated they are stored in RAM 134 (FIG. 2). The input into the process is shown in block 140 which includes the CID 8 bits, LI 6 bits and UUI 5 bits. A 5-bit partial CRC is calculated and stored in every entry of the CID table. In block 142 the 8 bit CID input is used as an address to index into the CID table and read out the 5-bit partial CRC associated with the access location. The process then enters block 148 in which the 5-bit partial CRC is concatenated to the 6 Li bits and 5 UUI bits to form 16 bits which are used as an address block 152 to access the CRC table 150. The read-out from the table is outputted in block 154 as the computed CRC.

As stated above, CID table 146 has 256 entries. The 256 entries are generated from the 8-bit CID field that is inputted. Since the CID field has 8 bits the number of positions that can be generated by 8 bits is $2^8$ which equals to 256 entries. The CID table with 256 entries includes 5-bit CRC entries. This is referred to as partial CRC because the calculated 5-bit CRCs are used to calculate the full CRC for the CPS packet header. The 5-bit partial CRCs are calculated by executing a CRC algorithm that uses the polynomial given in the AAL2 specification to generate 5 bits. Any of the well known CRC generating polynomials can be used for this generation. Examples of such polynomial which could be hardware or software are set forth in an article entitled "A Tutorial on CRC Computation" by Tenkasi V. Ramabadran and Sunil S. Gaitonde, Iowa State University, 62 IEEE Micro, August 1988 and an article entitled "High Speed Computation of Cyclic Redundancy Checks" by Eric E. Johnson, November 1995. The CID table 146, in addition to the 5-bit CRC which is associated with each of the 256 entries, store other information which is necessary in order to route the AAL2 cell. By placing the partial 5-bit CRC in the CID table the system throughput is further improved since the CID table has to be read anyway in order to process the CPS packet header and route the CPS packet. Stated another way, no additional machine cycle is wasted in order to obtain the partial CRC because it is placed in the CID table which has to be read anyway in order to route information package in the ATM AAL2 cell.

Still referring to FIG. 4, the CRC table 150 includes 64K entries. This table is generated by a $2^{16}$ CRC polynomial given in the AAL2 specification which generates 5 bit CRCs for each of the 64K entries. The $2^{16}$ entries are obtained by concatenating the partial 5-bit CRC block 142 with the 6 bits in the LI field and the 5 bits in the UUI field block 148. The algorithm and technique used for calculating the 5-bit CRC in table 150 can be any one of those described relative to CID table 146 or any other off-the-shelf algorithm suited for generating a $2^{16}$ 5-bit CRC.

In operation when a network device such as the ones shown in FIG. 1B is transmitting data the computed CRC in block 154 is placed in the CRC field of the CPS header. Since multiple CPS packets can be placed in an AAL2 cell a CRC header packet is calculated for each of the inputs. When the network device is receiving ATM AAL2 cell the 8 bits in the CID field is used as an address to index into table 146. The pre-stored 5-bit partial CRC which is stored at the access location is retrieved and concatenated with the 6 bits in the LI field and the 5 bits in the UUI field and is used as an address to index into CRC table 150. The computed CRC which is outputted in block 154 is compared with the 5-bit CRC received in the ATM AAL2 cell. If the calculated CRC matches the CRC received in the cell then the cell is accepted. If the comparison fails (i.e. the computed CRC is not identical to the received CRC) then the data is deemed corrupted and the cell is discarded.

By using the method described herein to calculate the CRC associated with the CPS header less storage is required than was heretofore been possible. The speed of calculating the CRC is also enhanced since the partial CRCs are stored in the CID table that has to be accessed in order to decide what action to take relative to the data in the AAL2 cell. In addition, system cost is less because less memory is used.

It should be understood that the above described arrangements are merely illustrative of the application of principles of the invention and that as arrangements may be devised by those having skill in the art without departing from the spirit and scope of the invention.

What is claimed is:

1. A method for generating a-bit CRC over n+m bits comprising the steps of:
    (a) partitioning a group of n+m bits into a first group of n bits and a second group of m bits;
    (b) using the n bits and a CRC algorithm to generate a first table of partial $2^n$ CRCs, where each CRC is a bits long;
    (c) concatenating a and m to form (a+m) bits;
    (d) using the CRC algorithm to generate $2^{(a+m)}$ CRCs wherein each CRC is a bits long; and
    (e) storing the CRCs calculated in step (d) in a second table with $2^{(a+m)}$ locations, wherein a, m, and n are positive integers.

2. The method of claim 1 further including the step of (f) selecting a CRC for a particular group of bits partitioned into the first group of n bits and a second group of m bits.

3. The method of claim 2 wherein the step of selecting further includes the steps of:
    (g) using the n bits of the particular group as an address to access the first table;
    (h) reading the value for the CRC recorded at the accessed location;
    (i) concatenating the CRC of step (h) and m bits to generate an address;
    (j) using the address in step (i) to access the second table; and
    (k) using the CRC stored at the accessed address as the CRC for the particular group of bits.

4. The method of claim 1 wherein a=5, n=8 and m=11.

5. A method to generate CRC for ATM adaptation layer (AAL2) including the steps of:
    (a) using a CRC generator to generate a first table of $a2^n$ CRCs wherein a represents number of bits in each CRC and n represents bits in a CID field;
    (b) generating with the CRC generator a second table of $a2^{n+L+U}$ wherein L represents bits in Li field and U represents bits in UUI field;
    (c) providing a CPS Header for a CPS packet;
    (d) using the bits in the CID field of the particular CPS header as an address to access the first table;
    (e) reading the CRC at the accessed location in said first table;
    (f) concatenating the read CRC with Li and UUI bits in the CPS header to generate an address to access the second table; and
    (g) using the CRC found at the address of the second table as the CRC for the CPS header, wherein a, n, L, and U are positive integers.

6. The method of claim 5 wherein a includes 5 bits, n includes 8 bits, U includes 5 bits and L includes 6 bits.

7. The method of claim 6 further including the step of writing the found CRC into the CPS header.

8. The method of claim 7 further including repeating the steps of (a)-(g) for each CPS header in the ATM cell.

9. The method of claim 8 further including the step of transmitting the ATM cell.

10. A method comprising the steps of:
    (a) providing a first table of $b2^n$ CRCs in a memory of a network device, wherein b represents number of bits in each CRC and n represents portions of bits in a predefined field;
    (b) providing a second table of $b2^{b+n+m}$ CRCs in said network device, wherein m represents the remaining portion of bits in said predefined field;
    (c) receiving in said network device an ATM AAL2 cell having a CPS header field;
    (d) using bits in a CID field to access the first table;
    (e) concatenating a value of a partial CRC found in (d) with bits in an LI field and a UUI field of said CPS header;
    (f) using the result of concatenating in (e) as an address to access the second table; and
    (g) using the value of CRC read in (f) as a desired CRC, wherein b, m, and n are positive integers.

11. The method of claim 10 wherein b=5, n=8 and n=11.

12. The method of claim 10 further including the step of comparing the CRC generated in (g) with a CRC received in (c).

13. The method of claim 12 further including the step of discarding a received ATM AAL2 cell if CRCs do not match.

14. The method of claim 12 further including the step of using the received ATM AAL2 cell if CRCs match.

15. The method of claim 10 wherein the network device includes a network processor.

* * * * *